United States Patent [19]
Momiyama et al.

[11] Patent Number: 4,519,685
[45] Date of Patent: May 28, 1985

[54] FINDER FOR SINGLE LENS REFLEX CAMERA

[75] Inventors: Kikuo Momiyama; Takashi Uchiyama; Ryoichi Suzuki, all of Kanagawa; Hiroyasu Murakami, Tokyo; Masaharu Kawamura, Kawasaki; Shinji Sakai, Tokyo, all of Japan

[73] Assignee: Canon Kabushiki Kaisha, Tokyo, Japan

[21] Appl. No.: 321,098

[22] Filed: Nov. 13, 1981

Related U.S. Application Data

[63] Continuation of Ser. No. 105,986, Dec. 21, 1979, abandoned.

[30] Foreign Application Priority Data

Dec. 26, 1978 [JP] Japan .................. 53-164149

[51] Int. Cl.$^3$ .................. G03B 17/20; G03B 19/12
[52] U.S. Cl. .................. 354/154; 354/155; 354/289.1
[58] Field of Search .......... 354/155, 154, 289, 224, 354/225, 53, 60 E, 465, 471–475, 289.1, 289.11, 289.12

[56] References Cited

U.S. PATENT DOCUMENTS 3,630,134 12/1971 Nakamura .................. 354/155
4,140,378 2/1979 Suzuki et al. .................. 354/53
4,165,167 8/1979 Jurenz et al. .................. 354/53

Primary Examiner—John Gonzales
Attorney, Agent, or Firm—Toren, McGeady, Stanger

[57] ABSTRACT

In the disclosed viewfinder, a focusing plate receives light from an objective via a reflex mirror, and after focusing, passes light to an eyepiece via a penta prism. A by-pass optical system receives light from outside the view field of the viewfinder and directs the light through an information carrier outside the optical path of the photographic light and into the penta prism so that the information can be displayed close to the view field of the viewfinder.

19 Claims, 10 Drawing Figures

FINDER FOR SINGLE LENS REFLEX CAMERA

This is a continuation of application Ser. No. 105,986 filed Dec. 21, 1979, abandoned.

BACKGROUND OF THE INVENTION

1. Field of the Invention

This invention relates to a finder for a single lens reflex camera and particularly to a viewfinder that can display not only a photographic view field but also photographic information, such as the shutter time, aperture value, etc.

DESCRIPTION OF THE PRIOR ART

Several types of viewfinders whose fields of view display photographic information, such as shutter time, aperture value, etc., as well as the photographic view field are known. In one type, a light beam from outside the camera illuminates an information source, such as a meter and directs the light through the reflex camera's penta prism with auxiliary members. In another type, the information source is arranged in the optical path of the view field under the base plane of the penta prism and is illuminated by light coming through the objective. The resulting data light passes directly into the penta prism. In viewfinders where illumination occurs from outside, a light admitting window has to be arranged on the exterior of the camera, thereby marring the camera's appearance and subjecting the measurement to obstruction because the light admitting window can easily be covered by a hand when handling the camera. Also, it requires a large space inside of the camera because the illuminating light must be directed to the information source.

Systems utilizing light from an objective avoid this problem. However, conventional systems using this device place the information source in the optical path of the viewfinder field. This results in various problems when liquid crystal display plates are used, because such plates must necessarily have large marginal areas around the information portion. As a result, the information display may be remote from the camera view field or may require a large view field to accommodate the information within the view field.

SUMMARY OF THE INVENTION

A purpose of the present invention is to offer a view finder for a compact single lens reflex camera, having many strong points, in which finder the information display means is illuminated with the light beam coming through the photographing lens whereby the display is made around the view field in the finder view field, so designed that the information can be displayed in the neighborhood even in case such an information display means as has a large base plate outside of the information display part. In order to fulfill the above purpose the view finder in accordance with the present invention comprises an information display means arranged at a position distant from the photographing view field light, an information illumination means taking out, in the neighborhood of the focal plane of the view finder, the light forming an image outside of the photographing view field of the view finder in order to illuminate the information display means and an information light introducing means for introducing the display information light from the information display means to the base plane of the pentagonal prism, whereby the information display means is illuminated by means of the information illumination means, while the display information light from the information display means is led to the base plane of the pentagonal prism by means of the information introducing means, directed into the prism, passes through the common optical path with the photographing view light and displays the information at a certain predetermined position outside of the photographing view field.

DETAILED EXPLANATION OF THE INVENTION

Below the present invention will be explained in detail in accordance with the drawings.

Figure 1:
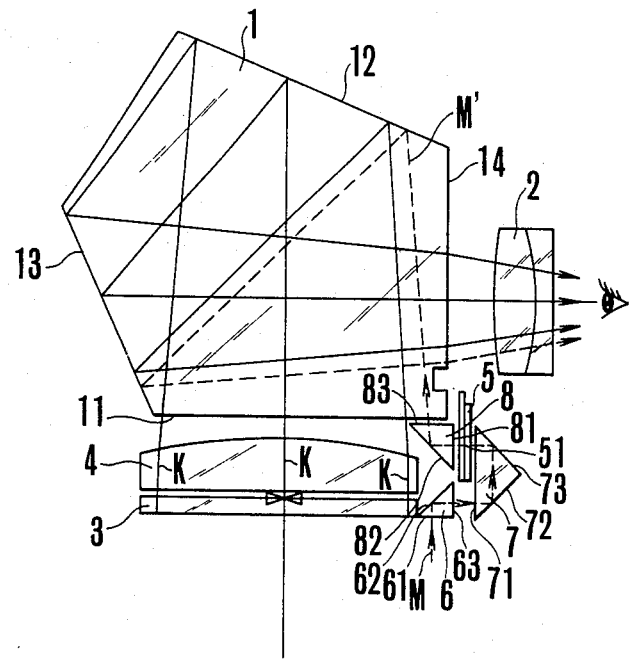
FIG. 1 shows the first embodiment of the present invention.
Figure 2:
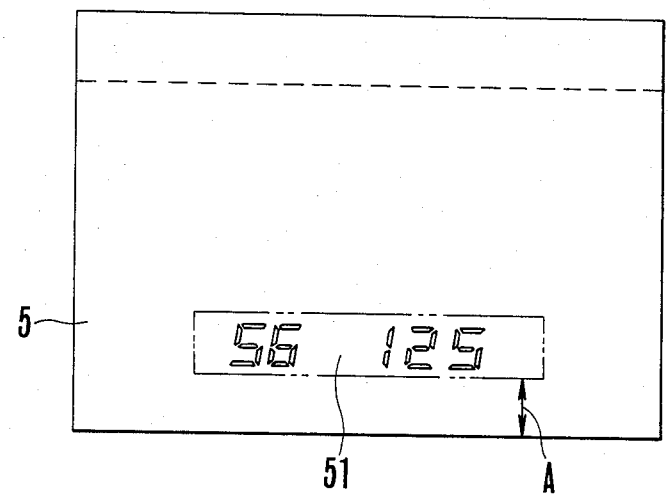
FIG. 2 shows the information display means of the first embodiment.
Figure 3:
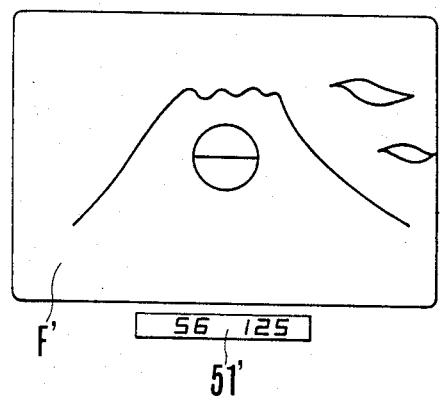
FIG. 3 shows the finder view field of the first embodiment.

FIG. 1 shows the first embodiment of the present invention. The light beam K of the object image formed on a focusing plate 3 is led into pentagonal prism 1 through a base plane 11 after having passed through a condenser lens 4, is reflected on the prism plane 12 and the front plane 13, goes out from the rear plane 14 and is directed toward the eye piece 2. Member 5 is an information display means, such as liquid crystal display plate shown in FIG. 2, arranged vertically in the neighborhood of the lower part of the rear plane 14 of the pentagonal prism 1. A triangle prism 12 has one reflecting plane 62 and two permeable planes, and is arranged at the side end of the focal plate. A triangle prism includes two reflecting planes 72 and 73 and one permeable plane 71 arranged to face the above triangle prism 6 and the information display means 5. The triangle prisms 6 and 7 constitute the information illumination means. 8 is the triangle prism having one reflecting plane and two permeable planes 81 and 82, constituting the information introducing means. The one permeable plane 81 of the prism 8 is arranged so as to face to the information display means 5, while the other permeable plane 83 is arranged so as to face to the base plane 11 of the pentagonal prism 1. The light beam M for forming the image outside of the photographic view field of the finder is introduced into the triangle prism 6 through the permeable plane 61, reflected sidewards on the reflecting plane 62, goes out through the permeable plane 63 and is directed toward the permeable plane 71 of the triangle prism 7. The light beam M is introduced into the triangle prism 7 through the permeable plane 71, reflected on the reflecting planes 72 and 73, goes out through the permeable plane 71 and is directed toward the information display part 51 of the information display means 5. The display information light M' from the information display part 51 illuminated by means of the light M is introduced into the prism 8 through the permeable plane 81 of the triangle prism 8, reflected on the reflecting plane 82, goes out through the permeable plane 83, is directed toward the base plane 11 of the pentagonal prism 1 so as to be introduced into the prism 1 and passes through the common light path with the photographing view field and displays in such a manner that the information display part, displays the display information 51' at a certain determined position at the lower part of the photographing view field F'. In case of the embodiment shown in the drawing, the permeable plane 83 of the pentagonal prism 8 can be connected to the base plane of the pentagonal prism 1. Further, the reflecting planes 62, 72, 73 and 82 of the triangle prisms 6, 7 and 8 can be totally reflecting and also can be metalized with the reflecting film such as of Al and so on. In case of the embodiment shown in the drawing, it is possible to display the information in the neighborhood of the photographing view field even when in the base plate there is a surplus portion, as is shown with the arrow A in the drawing, having nothing to do with the information display outside of the information display part 51 such as liquid crystal display plate 5 shown in FIG. 2, which contributes much to the realization of the compact optics.

Figure 4:
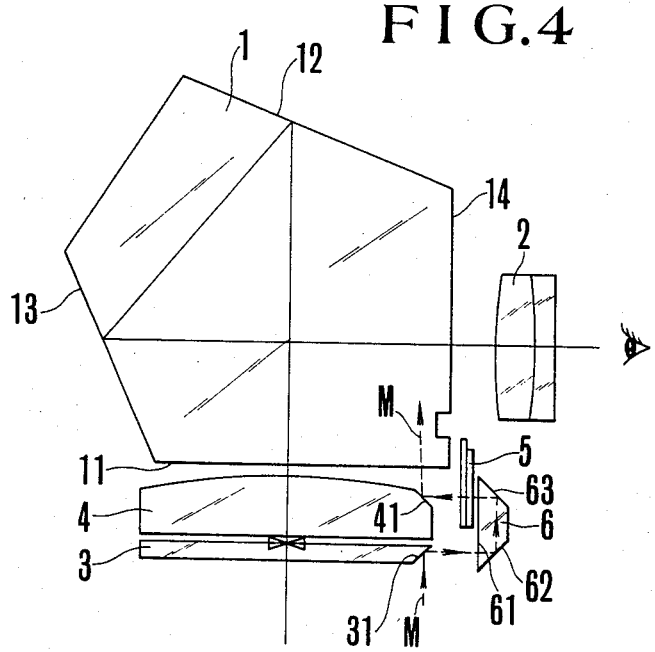
FIG. 4 shows the second embodiment of the present invention.

FIG. 4 shows the second embodiment.

1 is the pentagonal prism, 2 is the eye piece, 3 is the focusing plate and 4 is the condenser lens. The above elements are arranged almost in the same way as the view finder shown in FIG. 1. 5 is the information display means, arranged in the same way as in case of the first embodiment. In case of the present embodiment shown in the drawing, the focusing plate 3 presents an inclined reflecting plane 31 metalized with a reflecting film. 6 is a trapezoidal prism having one permeable plane and two reflecting planes 62 and 63, whereby the permeable plane 61 is arranged so as to face to the inclined reflecting plane 31 of the focusing plate 3 and the information display means. Hereby, the inclined reflecting plane 31 and the trapezoidal prism 6 constitute the information illumination means. The condenser lens 4 has the inclined reflecting plate 41 metalized with the reflecting film, constituting the information introducing means. The light beam M for forming the image outside of the photographing view field is reflected sidewards by means of the inclined reflecting plane 31 of the focusing plate 3, introduced into the trapezoidal prism 6 through the permeable plane 61, reflected on the reflecting planes 62 and 63 and goes out through the permeable plane 61 so as to be directed toward the display part 51 of the information display means 5.

The display information light M' from the information display part 51 illuminated by means of the light beam M is reflected on the inclined reflecting plane 41 of the condenser lens 4, and is directed toward the base plane 11 of the pentagonal prism 1 so as to be introduced into the prism. The display is made almost in the same way as in case of the embodiment shown in FIG. 1. In case of the present embodiment, the inclined plane of the focusing plate 3 and the inclined plane of the condenser lens 4 are made use of as reflecting plane so as to eliminate the triangle prism, which makes the construction simple and the cost goes down.

Figure 5:
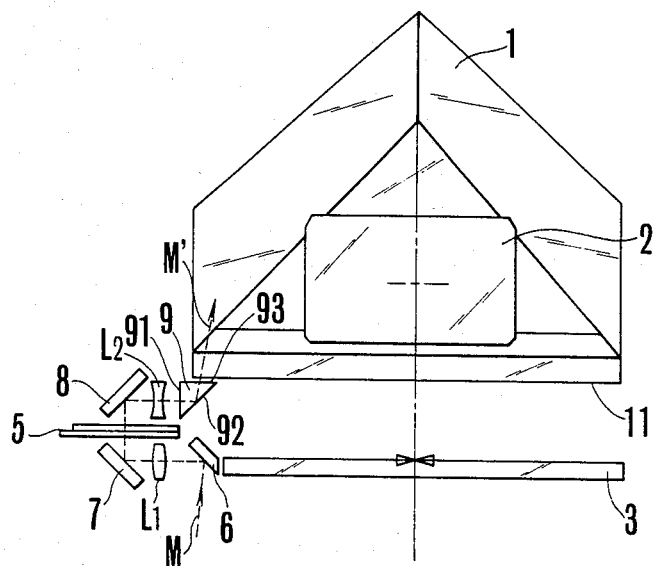
FIG. 5 shows the third embodiment of the present invention.

FIG. 5 shows the third embodiment.

1 is the pentagonal prism, 2 is the eye piece lens and 3 is the focusing plate. The above elements are arranged almost in the same way as in case of the embodiment shown in FIG. 1. 5 is the information display means, being arranged horizontally at the side at the lower part of the pentagonal prism 1. 6 is the reflecting plate, $L_1$ is the convex lens and 7 is the reflecting plate, constituting the information illumination means as a whole. 8 is the reflecting plate, $L_2$ is the concave lens and 9 is the triangle prism constituting the information introducing means as a whole.

Figure 6:
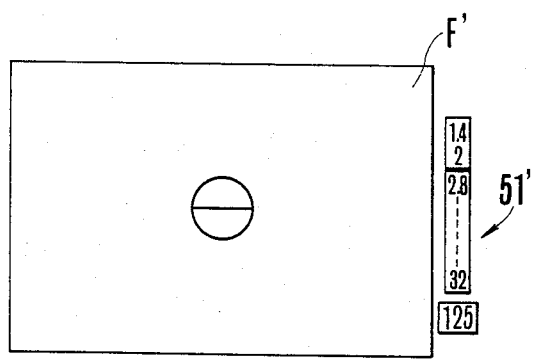
FIG. 6 shows the finder view field of the third embodiment.

The light beam M for forming the image outside of the photographing view field is sidewards reflected on the reflecting plate 6, directed toward the convex lens $L_1$ so as to be converged and reflected upwards on the reflecting plate 7 so as to be directed toward the information display part 51 of the information display means 5. The display light beam M' from the information display part 51 illuminated by means of the light M is sidewards reflected on the reflecting plate 8 so as to be directed toward the concave lens $L_2$ and diverged, reflected on the reflecting plane 92 of the triangle prism 9 and directed toward the base plane 11 of the pentagonal prism 1 so as to be introduced into the prism 1. Then, the light beam M' passes through the same light path as in case of the embodiment shown in FIG. 1 and displays the display information 51' at a certain determined position at the side of the photographing view field F' as is shown in FIG. 6. In case of the present embodiment, the information illumination means includes a convex lens so that the illumination light can effectively condensed upon the information display means by means of the lens. On the other hand, the information introducing means includes a concave lens so that even when the information display means is arranged at a distant position the sight degree of the display information can be coincided with that of the photographing view field.

Figure 7:
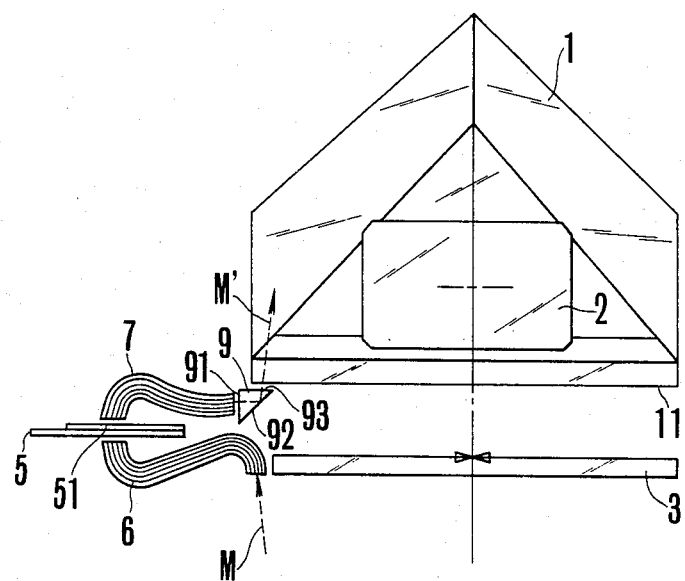
FIG. 7 shows the fourth embodiment of the present invention.

FIG. 7 shows the fourth embodiment of the present invention.

1 is the pentagonal prism, 2 is the eye piece lens and 3 is the focusing plate. The above elements are arranged almost in the same way as in case of the embodiment shown in FIG. 5. 5 is the information display means, 6 and 7 are the fiber and 9 is the triangle prism. In case of the present embodiment, the light beam M is taken out by means of the fiber 6 so as to directly illuminate the information display part 51 of the information display means 5. Hereby, the display information light M' from the information display means 5 is led to the permeable plane 91 of the traingle prism 9 through the fiber 7 and then passes through the same light path as in case of the embodiment shown in FIG. 5 so as to display the information in the view finder.

In case of the present embodiment, the fiber is made use of so that the freedom for the arrangement of the information display means is increased while the construction can be made simple, which is profitable.

Figure 9:
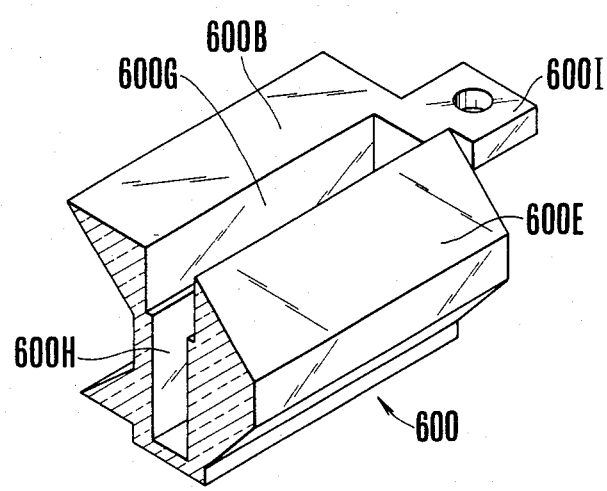
FIG. 9 shows the partially cut illumination visual acknowledgement prism of the fifth embodiment.
Figure 8:
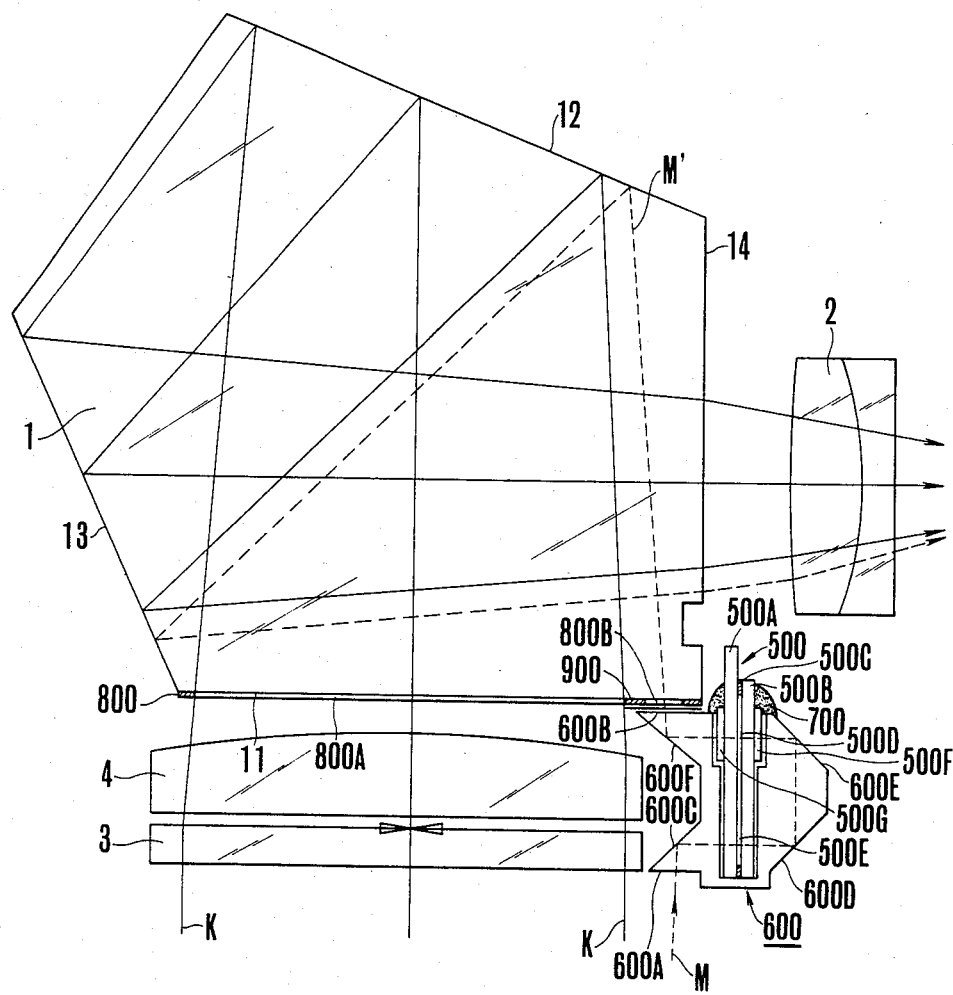
FIG. 8 shows the fifth embodiment of the present invention.

FIGS. 8 and 9 show the fifth embodiment of the present invention. In the drawings, 1 is the pentagonal prism, 2 is the eye piece lens, 3 is the focusing plate and 4 is the condenser lens. The above elements are arranged almost in the same way as in case of the view finder shown in FIG. 1. In the drawing, 500 is the information display means, which is different from the above mentioned display means 5 in the fact that the surplus part of the base plate (corresponding to A in FIG. 2) outside of the information display part is positively made large in such a manner that as compared with the first to the fourth embodiments the manufacture of the information display means becomes easier. The information display means 500, whose construction is shown in detail in the drawing, consists of the glass plates 500A and 500B and the spacer 500C in such a manner that between the glass plates 500A and 500B transparent electrodes in the desired shape for displaying the information are arranged on the upper 500D and the connecting transparent electrodes for connecting the above transparent electrodes to each other are arranged on the lower 500E. The information display means of the present embodiment can be constituted as electrochromy display means in the same way as in the case of the above embodiment or as liquid crystal display means, whereby when it is constituted as liquid crystal display means of field effect type, it is sufficient that the both glass base plates are treated in a conventional way, the liquid crystal material is sealed between the base plates and the polarization plates 500F and 500G are added, as is shown in the drawing. 600 is the illumination visual acknowledgement prism. In case of the embodiment shown in FIG. 1, the optical path constituted of the triangle prisms 6, 7 and 8 is made one body with transparent acryl resin so as to lower the manufacturing cost.

FIG. 9 shows the partially cut illumination visual acknowledgement prism in perspective view. As is shown in the drawing, the illumination visual acknowledgement prism presents the illumination light leading in plane 600A, the visual acknowledgement information light leading out plane 600B, the reflecting planes 600C to 600F, the loading part 600H with the opening 600G for loading the display means and the arm 600I for mounting on the camera body.

After the information display means 500 has been loaded into the loading part 600H of the illumination visual acknowledgement prism 600, as is shown in FIG. 8, the circumference of the opening 600G is sealed by means of the water-proof binder 700 so as to secure the information display means 500 to the prism 600 and to prevent the deterioration of the polarization efficiency of the polarization plates 500F and 500G generally with inferior water-proofness, due to water. 800 is the visual field mask. Although in case of the aforementioned embodiment the mask is omitted in the drawing, it presents the object visual acknowledgement window 800A and the display information visual acknowledgement window 800B. The display information visual acknowledgement window 800B only allows the visual acknowledgement of the range of the information display part in FIG. 2 (51 in FIG. 2) in two-dot dash line in such a manner that other part having nothing to the display information cannot be visually acknowledged. Hereby it is possible to lack the base plate itself of the display means black excepting the information display portion in such a manner that the size and the shape of the display window 800B of the view field mask 800 should be almost equivalent to them.

In the drawing, 900 is the display scale plate consisting of such material as photographed film cemented on the lower part of the display window 800B of the view field mask. Different from the case in FIG. 2, it is possible to provide the desired figures auxiliary on the display scale plate 900 in case all of the display information cannot be made only with the shape of the liquid crystal as in case of the embodiment in FIG. 6. Hereby, it is normally desirable that all of the display assume almost the same sight degree as on the focal plane of the focusing plate 3, while even in case of the present embodiment the display can be arranged in the neighborhood of the liquid crystal display means, for example close to the left of the polarization plate 500G depending upon the power of the condenser lens 4.

In case of the present embodiment constituted as mentioned above, when the illumination light is introduced to the information display means 500 through the planes 600A, 600C, 600D and 600E and the voltage is applied to the determined electrodes of the electrode group constituted in desired shapes the determined information can be visually acknowledged through the display window 800B. The part 500E is filled with liquid crystal material, whereby the transparent electrodes on the glass base plate 500A and there on the glass base plate 500B are arranged not to face to each other in the range corresponding to the information display part so that the illumination light passing through the part 500E is only polarized, which makes no obstacle for the information display.

As explained above, the present embodiment is filled with liquid crystal and the transparent electrodes for wiring are provided, whereby the illumination light passes through the portion provided so as to have nothing to do with photoelectrical efficiency at the time of the voltage application so that it is not necessary to make effort for checking the surplus portion of the glass base plate as small as possible when the liquid crystal display means is manufactured. Further, as is shown in the drawing, no polarization plates (500F, 500G) are provided on both sides of 500E, the loss of the light amount due to the support means of the polarization plates is eliminated. Further, for the sake if the space for providing the display means or the sight degree to be matched with the focusing plane it is possible that the illumination light passes through the information display part at first so as to be converted into information light and then passes through the part having nothing to do with the photoelectrical efficiency so as to be visually acknowledged, quite contrary to the embodiment in the drawing.

In case of the present embodiment, the illumination and the visual acknowledgement prism are combined into one body so as to realize the manufacturing cost down, while the information display means is loaded in the loading part and the loading opening is sealed with the packing material so that not only the information display means is secured but also the efficiency deterioration of the polarization plates due to water or the growth of water drops undesirable for the display efficiency can be prevented, which is remarkably advantageous.

Figure 10:
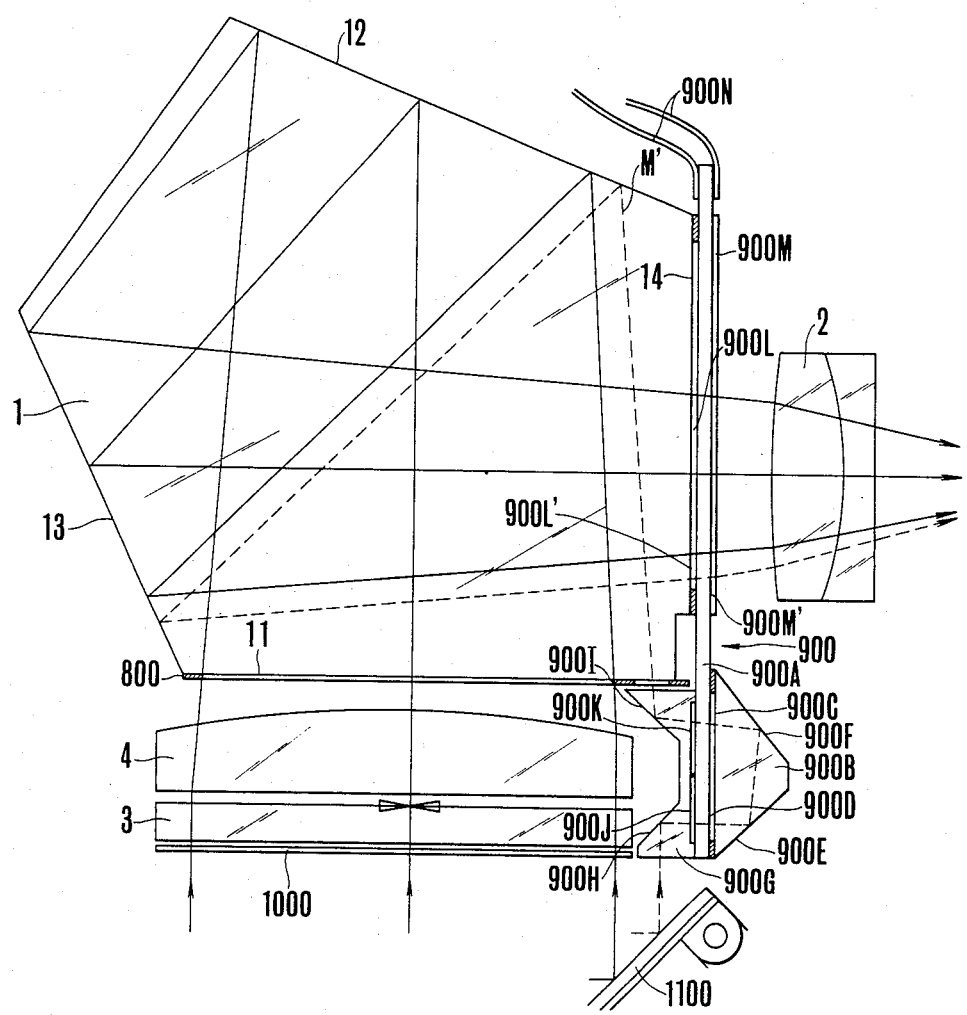
FIG. 10 shows the sixth embodiment of the present invention.

FIG. 10 shows the sixth embodiment of the present invention. In the drawing, 1 is the pentagonal prism, 2 is the eye piece lens, 3 is the focusing plate and 4 is the condenser lens. The above elements are arranged almost in the same way as in case of the view finder in FIG. 1. In the drawing, 900 is the information display means, whereby different from the information display means 5 or 500 of the former embodiments as at least one of the parallel glass plates (only whose one is shown in the drawing) necessary for constituting the display means the plane of the optical member for the object visual acknowledgement, illumination light or information light transmission is made use of so as to decrease the number of the optical members. 900A is the parallel glass plate for constituting the display part 900C corresponding to 500D of the embodiment in FIG. 8 and the illumination light permeable part 900D having nothing to do with the photoelectric display efficiency corresponding to 500E.

900E and 900F are the planes treated so as to be reflecting, whereby when they are arranged in such a manner that the illumination light passes slantly through the liquid crystal portion as is shown in the drawing, the contrast of the liquid crystal can at times be increased. 900G is a prism having the reflecting planes 900H, 900I and the polarization plates 900J and 900K loaded is cemented in the right loading part. The prism presents the mounting part similar to the illumination, visual acknowledgement prism 600 in FIG. 9 so as to be mounted on the camera body or cemented on the glass base plate 900A.

Further, the glass base plate 900A constitutes a light permeable opening and closing part 900L together with the light leading out plane 14 of the pentagonal prism 1 and presents a polarization part 900M at the side close to the eye piece lens 2, whereby the electrode parts are electrically connected to the respective electrodes of the flexible printed plate 900N to be brought into contact with the circuits for applying the voltage to the determined electrodes. 1000 is the polarization plate. Although it is shown under the focusing plate 3 in the drawing, it can be arranged at any position under the light incident plane 11 of the pentagonal prism 1.

The present invention is constituted as mentioned above, the photographing information can be displayed in the same way as in case of the fifth embodiment. Hereby, different from the above embodiment the display information light is led to the eye through the light permeable opening and closing part 900L filled with liquid crystal material and the polarization plate 900M, whereby different display mode can be realized when the polarization axis of the polarization plate 900K coincides with that of the polarization plate 900M or is made perpendicular to that of the polarization plate 900M. Namely, when the polarization axis of 900K and that of 900M coincide with each other, when the voltage is applied between the electrodes facing to each other of 900L the photographing information can be displayed in the same way as in case there are no 900L nor 900M, while when no voltage is applied between the electrode facing to each other of 900L the display part of the photographing information is completely shaded so that the visual acknowledgement can be made in the same way as in case no display part is provided namely only the object view field window is provided.

On the other hand, in case the polarization axis of the polarization plate 1000 coincides with the polarization axis of the polarization plate 900M, when the voltage is applied between the electrodes facing to each other of 900L the object view field window becomes light permeable in such a manner that the object can be visually acknowledged, while when the voltage application is interrupted the object view field window becomes non-light permeable. Hereby, it goes without saying that when the axes of both of the polarization plates are arranged so as to be perpendicular to each other the bright and the dark display are inversed.

Further, when the transparent electrode at 900L' under the light permeable opening and closing part 900L is constituted independent of 900L the opening and closing control of the object view field window can be made completely independent of the control of the information display window, while when the 900M' under the polarization plates 900M corresponding to the light path of the photographing information light is constituted with the different polarization plate from 900M not only the combination of the bright and the dark display can freely selected depending upon the voltage application or the nonvoltage application to the view field window and the information display window but also more free combination can be selected when a color polarization plate having wave length selectivity is used as at least one of the polarization plates in the optical path.

The present embodiment is constituted and operates as mentioned above so the following various effects can be realized. The display means can be made one body with the information visual acknowledgement glass body (900A can be combined with 900G in stead of 900B) or further with the object visual acknowledgement glass body so as to economize the optical members. Further, the view field of the eye piece lens is totally or partially provided with the permeable light opening and closing means so that at the time of misoperation such as the oblivious of the eye piece shuttering at self-timer photography or the closing of the main switch the alarm can be made by totally darkening the eye piece or flickering by alternatively changing the red and the transparent state. Further for the people who consider it inconvenient that the information is displayed at the time of deciding the framing of the object, it is possible not only to shade only the display part by the switching over but also to increase the display effect by arranging the color polarization plate at a desired position.

1100 shown in FIG. 10 is the reflecting mirror for a single lens reflex camera. Although this is not limited to the embodiment shown in FIG. 10, in case for example the reflecting plane of the mirror 1100 is treated with coating so as to raise the reflecting efficiency or to modify the color feeding at the object visual acknowledgement the reflecting surface reflects only the specifically polarized light strongly and small amount of the light perpendicular to the polarized light in such a manner that the display becomes inferior due to the relation with the polarization direction of the liquid crystal display means in case the coating consists of mulitlayer of dielectrics, though the above inconveniences are rare in case the coating consists of metals.

Such a phenomenon may take place not only on the reflecting mirror 1100 but also the surfaces (for example 900E, 900F) of the display prism. In such a case, it is sufficient to compare the display means by making the polarization direction of the polarization plate 900J for example in the embodiment in FIG. 10 coincide with the direction along which the polarization reflecting property of the reflecting plane is strongest. (The above construction is comprehensive only from the explanation so that the drawing is omitted here.)

The above relates to the counter-measures against the polarization properties, whereby it is also possible to decrease the number of the polarization plates to be used from the different view point. Namely, it is possible to eliminate the polarization plates (for example 900J, 900K) by giving polarization properties to each reflecting plane or permeable plane and arrange it before or behind the display means. For example, as the above reflecting mirror 1100 such a reflecting mirror provided with polarization properties as is arranged on the rear plane of the liquid crystal display means such as for watches, electronic calculators and so on can be made use of.

As so far explained, the view finder of the present invention has many strong points, being so designed that the information display means is illuminated by means of the light coming through the photographing lens and the informations are displayed around the photographing view field in the finder view field. Especially, even when an information display means such as liquid crystal and so on having a large shading portion outside of the information display portion is used, the informations can be displayed in the neighborhood of the photographing view field by means of a compact and simple construction, which is remarkably advantageous.

What is claimed is:

1. A viewfinder for a single lens reflex camera defining a plane for photosensitive material, comprising:
    an observation optical system including an objective for forming an object image on the plane, a focusing plate, a mirror for reflecting photographic light from the objective toward the focusing plate, a penta roof prism having a base, an eyepiece, said focusing plate forming a photographic view field, and a by-pass optical system positioned in the neighborhood of said focusing plate,
    said by-pass optical system including a light intake part for receiving light other than photographic light passing through said objective, information illumination means for directing the light along an optical path different from that of the photographic light, display means in the optical path of said information illumination means but outside of the photographic view field of the viewfinder and having an information display portion, and information light introducing means adjacent the base of the penta roof prism and having a light exit outlet to display the information display portion at a position close to the view field of the viewfinder,
    the information illumination means and the information light introducing means is a one-piece molded member of light permeable material.

2. A viewfinder for a single lens reflex camera according to claim 1, wherein one of the information illumination means and the information light introducing means include a lens system.

3. A viewfinder for a single lens reflex camera according to claim 1, wherein the display means includes a liquid crystal display plate.

4. A viewfinder for a single lens reflex camera as in claim 1, wherein the one-piece molded member includes a concave part forming an opening to house the information display means and having a circumference around the opening of the concave part, and water-proof material sealing the opening at the circumference.

5. A device as in claim 1, wherein said information illuminating means includes light deflecting means for illuminating said display means by sequentially deflecting light away from said focusing plate and back toward said focusing plate, said information introducing means being arranged for receiving the light directed back toward said focusing plate and directing the light toward the base of said roof prism.

6. A viewfinder for a single lens reflex camera defining a plane for photosensitive material, comprising:
    an observation optical system including an objective for forming an object image on the plane, a focusing plate, a mirror for reflecting photographic light from the objective toward the focusing plate, a penta roof prism having a base, an eyepiece, said focusing plate forming a photographic view field, and a by-pass optical system positioned in the neighborhood of said focusing plate,
    said by-pass optical system including a light intake part for receiving light other than photographic light passing through said objective, information illumination means for directing the light along an optical path different from that of the photographic light, display means in the optical path of said information illumination means but outside of the photographic view field of the viewfinder and having an information display portion, and information light introducing means adjacent the base of the penta roof prism and having a light exit outlet to display the information display portion at a position close to the view field of the viewfinder,
    said display means including a light permeable optical material having at least one plane with a photoelectrically operative part, said plane forming an opening and closing portion for light passing through the display means,
    said prism forming an exit plane, and shutter means for operating photo-electrically between the light permeable optical material and the exit plane of the penta roof prism, so that opening or closing of the shutter means can control a whole or a part of an object view field.

7. A viewfinder for a single lens reflex camera according to claim 6, in which the shutter means includes a liquid crystal material.

8. A viewfinder for a single lens reflex camera according to claim 6, wherein the shutter means is also located within the information illuminating optical path to control illumination of the display means so that control of opening and closing for an object view field and control of opening and closing for the information display occur independent of each other.

9. A viewfinder of a single lens reflex camera according to claim 8, wherein the shutter means includes a liquid crystal material.

10. A viewfinder for a single lens reflex camera having an objective, comprising:
    a pentagonal prism,
    a reflex mirror in the path of light from the objective for directing light to the pentagonal prism, said reflex mirror and said prism forming a view field,
    an information display arrangement located outside of the view field,
    information illuminating means directed to said information display arrangement for illuminating said display arrangement,
    information introducing means for directing the light from said display arrangement to the pentagonal prism, said pentagonal prism having a base plane at which light from the mirror is directed, said prism receiving the light from said information display arrangement at said base plane,
    said information illuminating means and said information light introducing means being formed of a single unitary member.

11. A viewfinder as in claim 10, wherein said member includes a concave portion for receiving said information introducing means, said concave portion forming an opening and a circumference around the opening, water-proof material sealing said opening at the circumference.

12. A viewfinder for a single lens reflex camera having an objective, comprising:

a pentagonal prism, a reflex mirror in the path of light from the objective for directing light to the pentagonal prism, said reflex mirror and said prism forming a view field, an information display means located outside the view field, information illuminating means directed to said information display means, information introducing means for directing the light from said display means to the pentagonal prism, said pentagonal prism having a base plane at which light from the mirror is directed, said prism receiving the light from said display means at said base plane, said display means including at least two photoelectric portions, each of said portions having a light permeable optical material, at least one portion forming data, said portion being controllable for controlling the light passing from said information introducing means to said prism, the other portion including means for controlling light to the view field, said portions being capable of being controlled separately so that control of the light to the view field and from the information introducing means are independent of each other.

13. A viewfinder for a single lens reflex camera, comprising:

an observation optical system including an objective for forming an object image, a focusing plate for forming a view field, a mirror for reflecting photographic light from the objective toward the focusing plate, a penta roof prism having a base, an eyepiece, and a by-pass optical system positioned in the vicinity of said focusing plate, said by-pass optical system including information illumination means for receiving light other than photographic light passing through said objective and directing the light along an optical path different from that of the photographic light, display means in the optical path of said information illumination means but outside of the photographic view field of the viewfinder and having an information display portion, and information introducing means adjacent the base of penta roof prism and having a light exit outlet to display the information display portion at a position close to the view field of the viewfinder, said information introducing means including a light deflecting member for directing the light toward the base of said roof prism.

14. A viewfinder for a single lens reflex camera according to claim 13, wherein one of the information illuminating means and the information introducing means includes a lens system.

15. A viewfinder for a single lens reflex camera according to claim 13, wherein the display means includes a liquid crystal display plate.

16. A single lens reflex camera comprising:

an objective;

a finder optical system;

a mirror for reflecting the light passing through said objective in the direction of said finder optical system;

first optical means for directing a portion of light reflected at said mirror out of the optical path between said mirror and said finder optical system;

second optical means for returning the light directed out of the optical path by said first optical means into said optical path; and display means positioned in the optical path between said first optical means and said second optical means.

17. A single lens reflex camera according to claim 16, wherein said first optical means includes a reflection member for reflecting a portion of the light reflected at said mirror in a direction different from the direction of said finder optical system.

18. A single lens reflex camera according to claim 17, wherein said second optical means includes a reflection member for reflecting the light reflected at said first optical means in the direction of said finder optical system.

19. A single lens reflex camera according to claim 18, wherein said first and second optical means are formed integrally.

* * * * *